UNITED STATES PATENT OFFICE.

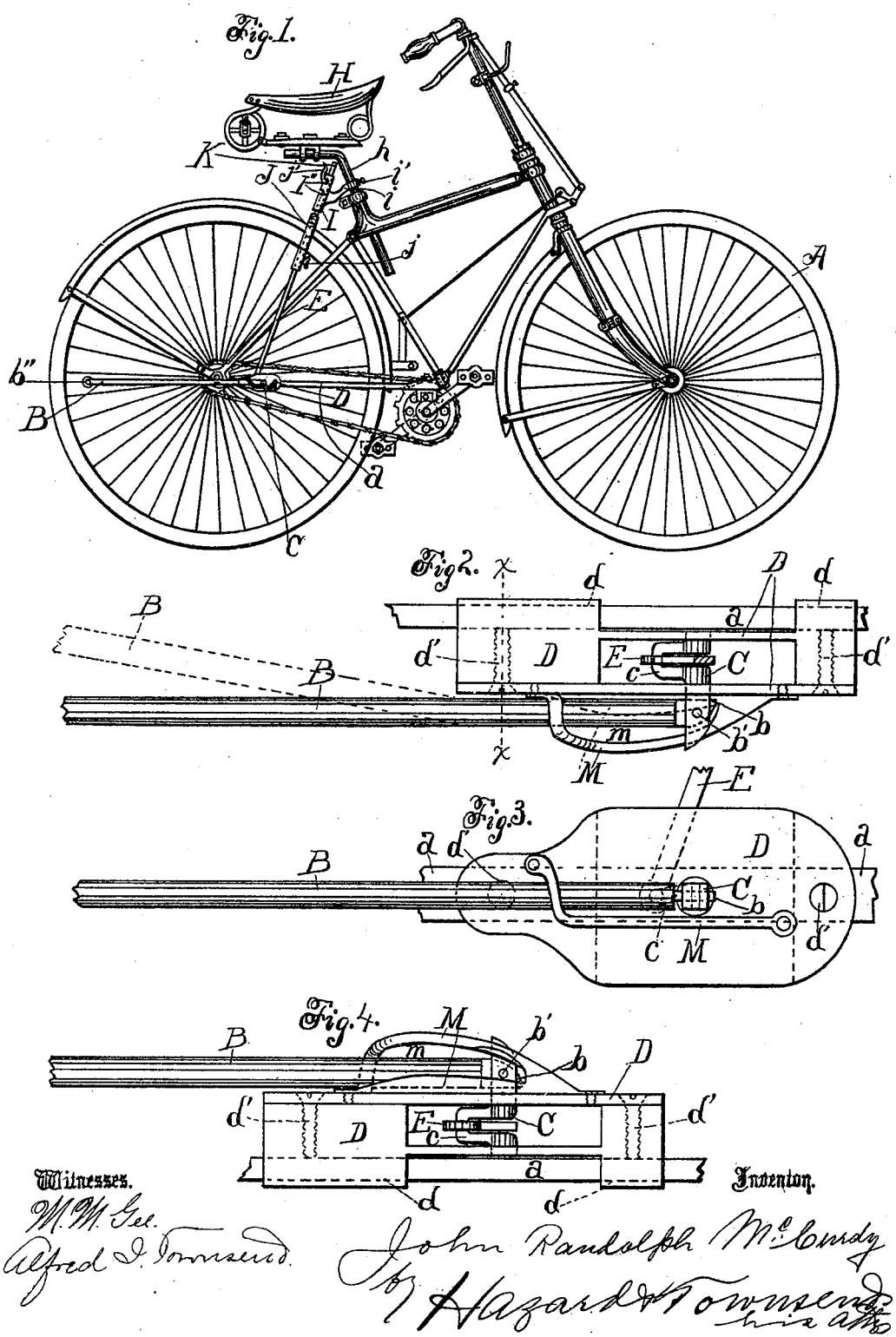

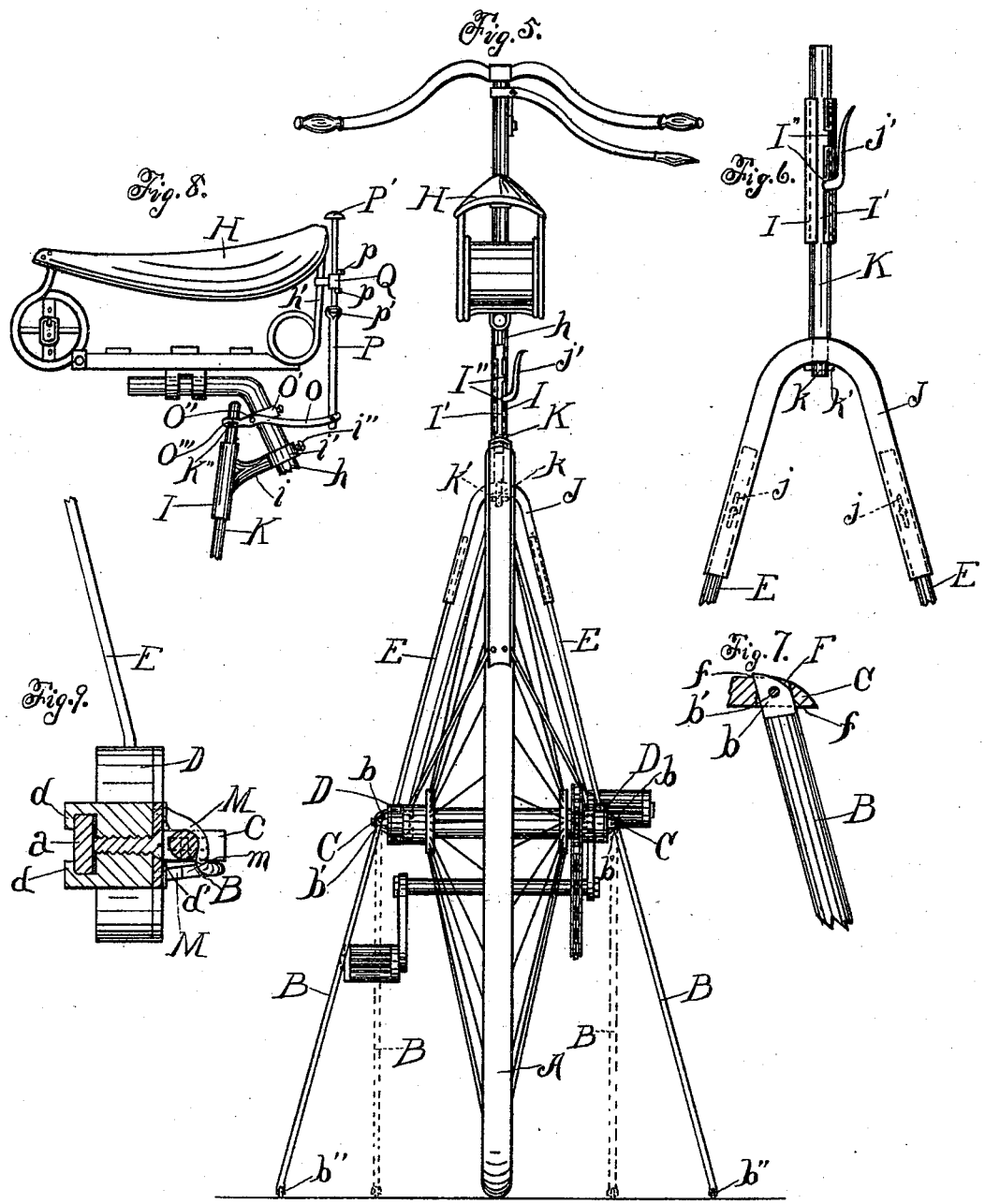

JOHN R. McCURDY, OF LOS ANGELES, CALIFORNIA, ASSIGNOR OF ONE-HALF TO MARTIN EICHHORN, OF SAME PLACE.

STAND ATTACHMENT FOR BICYCLES.

SPECIFICATION forming part of Letters Patent No. 496,530, dated May 2, 1893.

Application filed April 12, 1892. Serial No. 428,773. (No model.)

*To all whom it may concern:*

Be it known that I, JOHN R. MCCURDY, a citizen of the United States, residing at Los Angeles, in the county of Los Angeles and State of California, have invented a new and useful Stand Attachment for Bicycles, of which the following is a specification.

The object of my invention is to provide a cheap and simple attachment for bicycles, whereby the machine may be supported in an upright position without resting it against other objects, or placing it upon a stand.

My invention broadly stated comprises the combination with a bicycle of a leg or legs arranged to project from one or both sides of the wheel to the ground to support the wheel, and suitable means to operate the legs to raise them from the ground when the bicycle is in use. When two legs are employed, they are arranged one on each side of the bicycle and suitable means are provided connected with such legs and adapted for lowering and raising such legs.

My invention also comprises various features and combinations hereinafter fully set forth and claimed.

The accompanying drawings illustrate my invention.

Figure 1 is a side elevation of a bicycle provided with my attachment. In this view the legs are shown in the position they occupy when the wheel is in use. Fig. 2 is a plan view showing the actuating mechanism for raising and lowering the leg, attached to a fragment of the bar of the bicycle. A fragment of the leg is shown in the view in the position it occupies when elevated. Fig. 3 is a plain side elevation of the same parts in the same position shown in Fig. 2. Fig. 4 is a bottom view of the same. Fig. 5 is a rear view of a bicycle provided with my attachment. In this view the bicycle is shown supported by the legs. Fig. 6 is a detail of the plunger shaft and its sleeve. Fig. 7 is an enlarged sectional detail of the folding joint for the legs and the shaft. Fig. 8 is a plain side elevation of the seat and upper portion of the seat arm illustrating the means I provide to enable the operator, while seated on the bicycle, to throw the legs down to support the same. Fig. 9 is a cross-section on line $x-x$, Fig. 2.

In the drawings A is the bicycle.

For convenience of illustration I have shown my invention applied to a safety bicycle but the device is also adapted for ordinaries.

B B are legs or braces, which are pivoted to the crank shaft C which is journaled in a crank box D attached to the bar $a$ of the bicycle, and is actuated by a plunger E to partially rotate the shaft to throw the legs or braces B parallel with the bar $a$ of the bicycle, as shown in Fig. 1, or to throw them down to rest upon the ground upon each side of the bicycle, as illustrated in Fig. 5. The braces or legs B B are attached to the crank shaft C by a suitable joint arranged to allow the legs to open outward to rest upon the ground far enough from the machine to prevent it from overturning.

The joint I have illustrated is formed by making through the end of the crank shaft C, a mortise F having sloping ends $f$ and inserting thereinto the tenon $b$ (which is provided upon the end of the brace or leg B) and securing it in place by the pivot $b'$. The sloping ends $f$ permit limited movement of the tenon $b$ and while permitting the legs B to spread outward sufficient to form a stable brace, will also act as a stop to hold the leg from spreading too far.

The crank shaft C is journaled in the box D and is provided with the crank $c$ upon which is journaled one end of the plunger E, which extends upward to a point beneath the seat H of the bicycle where it is attached to the seat arm $h$ and is provided with suitable means arranged to actuate the plunger to partially rotate the crank shaft C.

In the drawings I have shown a leg B arranged upon each side of the bicycle, and the upper ends of the two plungers E inserted in the arms of a tubular inverted U shaped plunger socket J, which arms are provided with suitable means, such as the set screws $j$ for securing the plungers in the tubular arms, and allowing the plungers to be adjusted to suit the wheel to which the attachment is applied.

The plunger-operating shaft K is swiveled to the top of the U shaped member J by the reduced portion $k$ passed through the member J and secured by a pin $k'$.

The shaft K is journaled in a sleeve I which is secured to the seat arm $h$ by an arm $i$ having a collar $i'$ arranged to encircle the seat arm $h$ and secured in place by the set screw $i''$. This sleeve is provided with a longitudinal slot I' and the notches I'', and the shaft K is provided with a handle $j'$ the stem of which is adapted to slide along the slot and engage the notches to hold the shaft and plunger either up or down to hold the legs elevated, or to hold them lowered to support the bicycle as may be desired.

In order to provide a perfectly stable brace it is necessary that the legs B stand oblique to the wheel, and to allow unobstructed use of the bicycle it is necessary to have them fold inward to be parallel with the plane of the wheel when the legs are elevated. To accomplish this I provide the leg with operating guides M which are formed of wire or other suitable devices and are secured at each end to the box D and arranged oblique thereto to form the curved guideway $m$ which is arranged convergent to the wall of the box at the upper end of such guideway to throw the leg toward the wall of the box when the said leg is elevated, and is arranged divergent from the wall of the box at its lower end beneath the shaft C to force the leg B away from the wall of the box when the leg is lowered, thereby to cause the leg when lowered to stand oblique to the wheel. Any suitable guideways may be arranged to throw the lower end of the leg outward when it is lowered or to throw it in parallel with the wheel when the leg is elevated, without departing from the spirit of my invention, and I do not specially limit my claims to any specific arrangement of the guides.

A certain degree of utility may be attained by making the leg B and crank shaft C integral and allowing the legs B to stand parallel with the plane of the wheel when lowered to support the bicycle as indicated in dotted lines in Fig. 5, but the bicycle when thus supported could be more easily overturned.

To provide a cheap and convenient means for attaching the box D to the bar $a$ of the bicycle I provide the bar-clamping lugs $d$ upon the rear side of the box D, which are arranged to embrace the bar $a$.

To apply the box, the bar $a$ is loosened from the bicycle and the end thereof is inserted between the lugs $d$; the box, is then slipped along the bar to the point desired and is secured by the set screw $d'$ which is screwed through the box and arranged to engage the bar and force it against the lugs $d$ and rigidly secures the box upon the bar.

In order to provide convenient means for actuating the plungers to throw the legs downward to support the wheel while the cyclist remains in the saddle, I attach a shaft-actuating lever O to the upper end of the shaft K and extend it to the front of the seat arm $h$ to which it is pivoted (through intermediate means such as the collar O') by a pivot O''. To the outer end of this lever is pivoted a rod P which extends upward through a sleeve Q slotted similar to the sleeve I and secured to the seat spring $h'$. The rod P is provided with lugs $p$ arranged to engage the sleeve Q, and is also provided with a swivel joint $p'$ arranged below the said sleeve to allow partial rotation of the rod to bring the lugs $p$ into line with the slot or to cause them to engage with the slotted sleeve.

P' is a handle for manipulating the rod P. The lever O is provided with a slot O''' in which the pivot $k''$ slides as the plunger-actuating shaft is moved up and down to actuate the plungers.

$b''$ are caster wheels arranged upon the lower ends of the arms B to allow the wheel to be moved without elevating the braces from the floor.

In practice the operator dismounts from the bicycle, and lowers the legs to the position illustrated in Fig. 5, by throwing the stem of the handle $j'$, into the slot I' and forcing the shaft K and plungers E downward, thus causing the crank $c$ to move downward and partially rotating the shaft C; the legs B swing downward and following the slots $m$ the legs are thrown out from the bicycle and rest upon the ground oblique to the wheel; the stem of the handle $j'$ is then thrown into the lower notch of the sleeve I and so holds the various parts in position, until it is withdrawn from the notch to again operate the legs.

When the operator desires to mount the bicycle, he reverses the operation described, and the legs B are thrown upward by the action of the shaft C, and following along the slots $m$ are thrown in close to and parallel with the wheel or if desired, the outer ends may be brought close to the wheel, thus removing the legs entirely out of the way of the operator. This is indicated by dotted lines in Fig. 2.

It is designed that the various parts be constructed of steel rods, tubing and plates, thus providing a rigid support which may be carried with the bicycle with very slight addition of weight.

The various parts are adjustable to adapt the attachment to any safety wheel. By lengthening the plungers and legs it may be applied to ordinaries.

Now, having described my invention, what I claim as new, and desire to secure by Letters Patent, is—

1. In an attachment for bicycles, the combination of the crank box provided with suitable means for attachment to a bicycle; the crank shaft journaled in such box; the brace attached to the crank shaft by a suitable joint to allow the legs to spread outward; having the oblique leg-operating guides arranged to spread the legs outward when the leg is lowered; and suitable means for operating such crank shaft.

2. In an attachment for bicycles, the combination of the crank box provided with suitable means for attachment to a bicycle; the crank shaft journaled in such box and provided at one end with a mortise having sloping ends; the brace or leg provided at one end with a tenon arranged in such mortise; the pivots securing such tenons in place, and suitable means for operating the crank shaft.

3. In an attachment for bicycles the combination of a suitably journaled crank shaft provided with a crank; means for attaching such crank shaft to a bicycle; the leg or brace attached to such crank shaft; the plunger having one end journaled upon such crank and extending upward to a point beneath the seat of the bicycle and attached to the seat arm; and suitable means for actuating such plunger to partially rotate the crank shaft, substantially as and for the purpose set forth.

4. The combination in an attachment for bicyles of two suitably journaled crank shafts each provided with a crank; suitable means for attaching such crank shafts to a bicycle; the legs or braces attached to such crank shafts; the plungers each having one end journaled upon the crank of its respective crank shaft and its other end inserted in the arm of the plunger socket; such socket provided with the set screws; the plunger actuating shaft provided with the tenon passed through the top of the socket; means for securing such tenon therein to allow rotation of the shaft; the sleeve arranged around the shaft and provided with the longitudinal slot and the notches; means for securing such sleeve to the seat arm of a bicycle, and means arranged upon the shaft to slide along the slot and to enter the notches, substantially as and for the purpose set forth.

5. The combination of the crank box provided with means for attachment to a bicycle; the crank shaft journaled in such box and provided with the crank; the leg or brace attached to such crank shaft by a suitable joint arranged to allow the leg to spread outward; the obliquely arranged leg operating guide secured to the box and arranged to throw the leg in toward the wall of the box when the leg is elevated, and to force the leg away from the wall of the box when the leg is lowered, and suitable means for operating the crank shaft.

6. In an attachment for bicycles, the combination of the crank box provided with the lugs arranged to embrace the bar of the bicycle; the crank shaft journaled in such box and provided with the crank; the leg or brace attached to such crank shaft; the set screw screwed through the box and arranged to press against the bar, and means for operating the crank shaft.

JOHN R. McCURDY.

Witnesses:
JAMES R. TOWNSEND,
F. M. TOWNSEND.